United States Patent [19]

Müller et al.

[11] Patent Number: 4,968,733

[45] Date of Patent: Nov. 6, 1990

[54] PROCESS FOR PRODUCING MICROPOROUS POWDERS AND MEMBRANES

[75] Inventors: Heinz-Joachim Müller; Friedbert Wechs, both of Wörth, Fed. Rep. of Germany

[73] Assignee: Akzo N.V., Arnhem, Netherlands

[21] Appl. No.: 401,854

[22] Filed: Sep. 1, 1989

[30] Foreign Application Priority Data

Sep. 1, 1988 [DE] Fed. Rep. of Germany ....... 3829766

[51] Int. Cl.[5] .............................................. C08J 9/28
[52] U.S. Cl. ........................................ 521/64; 521/50; 521/61; 521/90; 424/DIG. 7; 210/500.21
[58] Field of Search ............... 521/50, 64, 90, 61; 524/98

[56] References Cited

U.S. PATENT DOCUMENTS 4,806,291 2/1989 Susa ........................................ 521/61

FOREIGN PATENT DOCUMENTS

3329578A1 3/1985 Fed. Rep. of Germany .

*Primary Examiner*—Veronica P. Hoke
*Assistant Examiner*—Anang Sridharan
*Attorney, Agent, or Firm*—Oliff & Berridge

[57] ABSTRACT

A process produces microporous powders or shaped articles, in particular membranes in the form of flat films, tubular films or hollow fibers, which may be used for controlled release of an active compound, for dialysis, gas separation, ultrafiltration or microfiltration, from polyvinylidene fluoride and/or polyphenylene sulfide and/or polysulfone and/or polyacrylonitrile and/or ethylene/vinyl alcohol copolymer and/or ethylene/chlorotrifluoroethylene copolymer and/or polyethersulfone and/or polyether-imide and/or polymethyl methacrylate and/or polycarbonate and/or cellulose triacetate. The process utilizes phase separation by means of thermally induced triggering or triggering induced by a non-solvent of a solution of the polymer in a mixture containing ε-caprolactam as the essential dissolving constituent. The solution may be formed before the phase separation is triggered.

11 Claims, 4 Drawing Sheets

FRACTURE SURFACES 350:1

INNER WALL 5000:1

OUTER WALL    5000:1

INSIDE    5000:1

OUTSIDE    5000:1

FRACTURE SURFACES    390:1

FRACTURE SURFACES 5000:1

FRACTURE SURFACES 5000:1

PROCESS FOR PRODUCING MICROPOROUS POWDERS AND MEMBRANES

TECHNICAL FIELD

The invention relates to a process for producing microporous powders or shaped articles, in particular membranes in the form of flat films, tubular films or hollow fibers, from a polyvinylidene fluoride and/or polyphenylene sulfide and/or polysulfone and/or polyacrylonitrile and/or ethylene/vinyl alcohol copolymer and/or ethylene/chlorotrifluoroethylene copolymer and/or polyether-sulfone and/or polyether imide and/or polymethyl methacrylate and/or polycarbonate and/or cellulose triacetate by phase separation by means of thermally induced triggering or triggering induced by a non-solvent.

BACKGROUND

Partitions which part liquid phases or gas phases from one another and thus allow exchange processes are described as membranes, which themselves are distinct phases built up from substances other than those of the phases which are to be separated. Membranes can be liquid or solid. Within the scope of the present invention, solid membranes of synthetic polymers are considered, and it should generally be assumed that those polymers are suitable for preparing them which can also be used for the production of films.

Depending on the intended uses, films should be impermeable to gases or liquids, whereas membranes allow a mass transfer between the phases separated by the membrane. The requirements to be met by the permeability differ depending on the type of mass transfer, such as osmosis, dialysis, ultrafiltration, electrodialysis and the like.

Membrane formation can be effected in different ways. More frequently, this is done via a polymer solution in a suitable solvent.

This membrane formation involves either evaporation or withdrawal from immersion in a precipitant (phase separation). In a suitable system, a phase separation can also take place as a result of cooling, a solvent-rich phase and a solvent-lean phase forming first, of which the solvent-lean phase solidifies on further cooling (German Offenlegungsschrift No. 2,737,745, German Offenlegungsschrift No. 2,833,493).

In the process for producing shaped articles having pores, according to German Patent No. 3,327,638, a porous polyamide-6 hollow fiber has already been produced from a mixture of polyamide-6, $\epsilon$-caprolactam and polyethylene glycol 300. Forming took place at a nozzle temperature of 210° C. The spinning solution was homogeneous and of low viscosity and was therefore extruded into a U-shaped cooling tube, in which the mechanical loading, to which the polymer mixture is exposed up to the time of solidification starting, that is to say the start of dimensional stability, is kept small.

In the Loeb-Souriragan process, a portion of the solvent is, after casting of the polymer solution, first evaporated and the polymer is then solidified by immersing the solution into a non-solvent. Low-boiling solvents are therefore necessary for this purpose. Aprotic solvents such as dimethylformamide, dimethylacetamide, N-methylpyrrolidone, dimethyl sulfoxide, dioxane, acetone triethyl phosphate and the like or acids such as, for example, acetic acid or formic acid have in general been used as solvents for the known membrane formation reaction.

The desired membrane type for the envisaged type of mass transfer can be obtained by means of a suitable composition of the polymer solution.

SUMMARY OF THE INVENTION

It is an object of the present invention to provide a solvent which can be universally used, as far as possible, for membrane formation and is readily available and which also makes it possible to exploit polymers which hitherto have not been soluble in a suitable manner, for membrane formation. It is a further object of the invention to provide a process for producing microporous powders or shaped articles, in particular membranes in the form of flat films, tubular films or hollow fibers, from polyvinylidene fluoride and/or polyphenylene sulfide and/or polysulfone and/or polyacrylonitrile and/or ethylene/vinyl alcohol copolymer and/or ethylene chlorotrifluoroethylene copolymer and/or polyether-sulfone and/or polyether-imide and/or polymethyl methacrylate and/or polycarbonate and/or cellulose triacetate by phase separation by means of thermally induced triggering or triggering induced by a nonsolvent.

These and other objects are achieved by a process for producing membranes from the synthetic polymers by dissolving the polymer in a mixture containing $\epsilon$-caprolactam as the essential dissolving constituent, forming the solution and triggering phase separation. The polymers can be copolymers or mixtures of the said polymers.

Figure 1A:
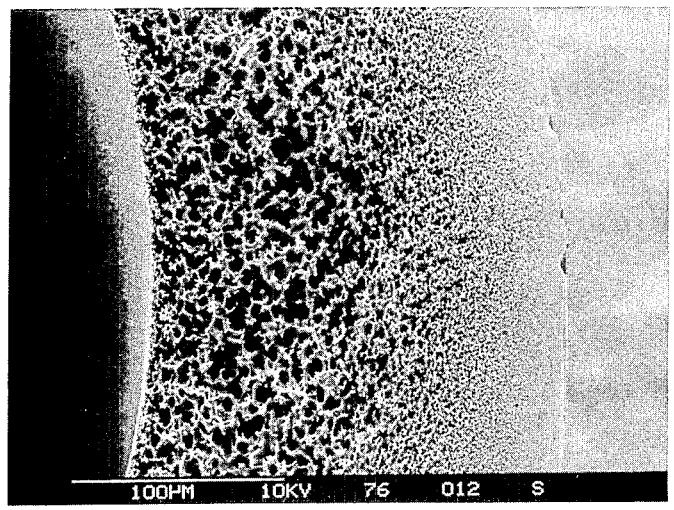
FIGS. 1A to 1E shows scanning electron micrographs of a membrane produced according to Example 1.
Figure 1B:
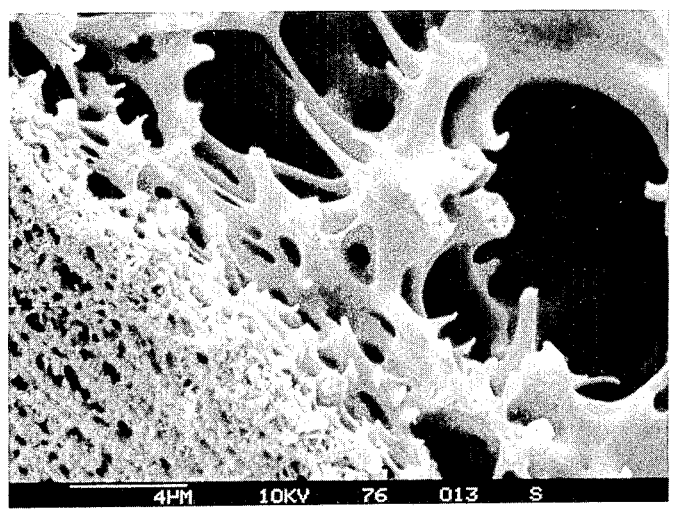
Figure 1C:
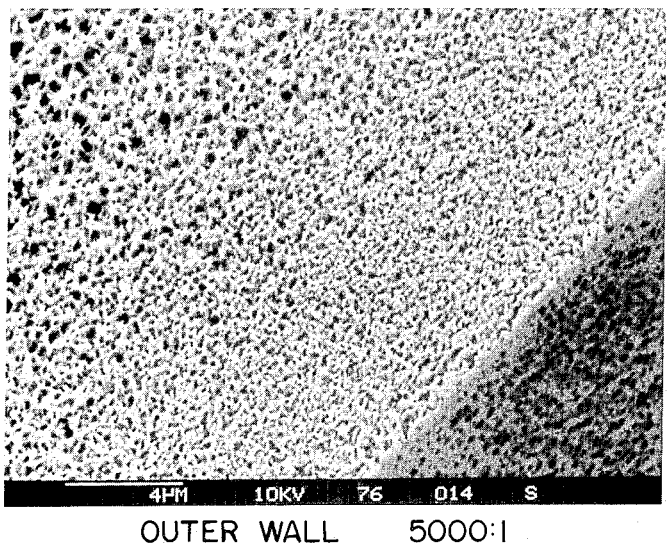
Figure 1D:
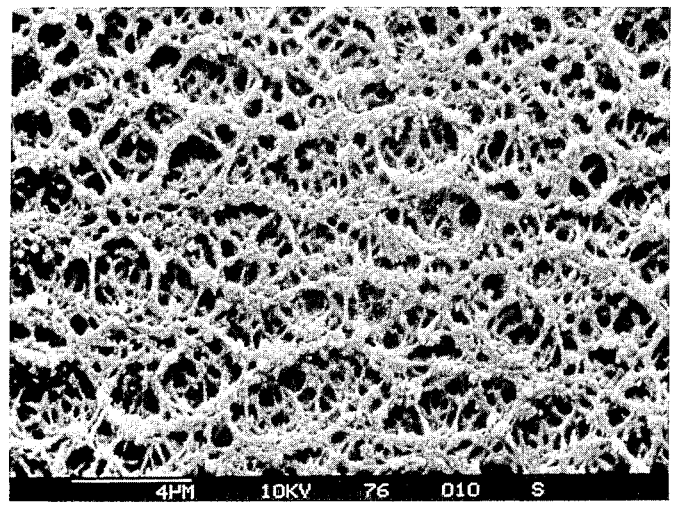
Figure 1E:
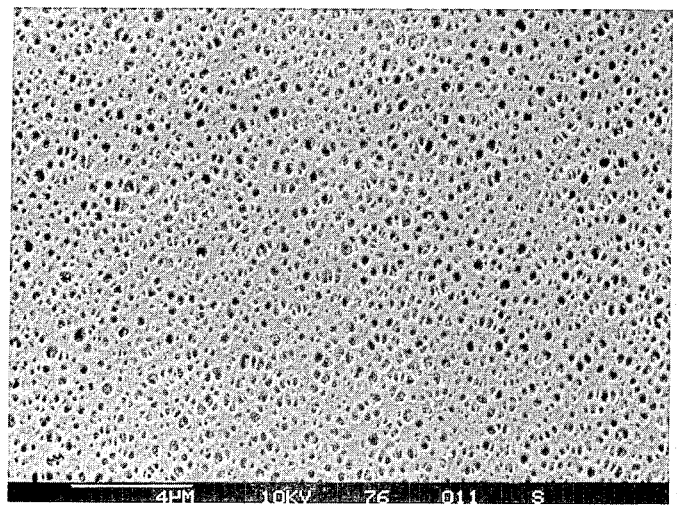

DETAILED DESCRIPTION OF THE PREFERRED EMBODIMENT $\epsilon$-Caprolactam is a hygroscopic substance melting at about 70° C. and having a boiling point (under normal pressure) of 268.5° C. It is readily soluble in water and numerous organic solvents such as, for example, toluene, isopropanol, glycerol, polyethylene glycol, butyrolactone, propylene carbonate, ethyl acetate, methyl ethyl ketone and cyclohexane. It is produced industrially on a considerable scale and forms the monomer for polyamide 6 polymers, and is therefore available at low prices. With exclusion of oxygen, $\epsilon$-caprolactam is thermally stable, disregarding the fact that, at temperatures of 260°–270° C. in the presence of water, it undergoes a polyaddition to form polyamide 6, with ring opening.

From its use as the monomer for polyamide-6, the properties of $\epsilon$-caprolactam are well known. The recovery of $\epsilon$-caprolactam from aqueous solutions is likewise well known.

$\epsilon$-Caprolactam is a substance of very low toxicity. It is the view that, in handling $\epsilon$-caprolactam, apart from the nuisance due to the bitter taste and a possible irritation of mucosae by $\epsilon$-caprolactam powder, there is no health risk even in the case of repeated exposure. Because of the high solubility, any residues can be completely removed from the membranes formed by means of $\epsilon$-caprolactam.

Further possible constituents of the solution are proportions of latent solvents, thickeners, non-solvents and auxiliaries. Within the scope of the present invention, latent solvents are to be understood as those substances which dissolve the membrane-forming polymer only sparingly or at elevated temperature. Examples of such latent solvents are butyrolactone or propylene carbonate, and polyalkylene glycols, and these can act in different ways depending on the type of polymer. The quantity of latent solvents depends on the polymer used and on the desired membrane type. The proportion in the solvent mixture can be up to 80% by weight.

Thickeners are understood to be those substances which increase the viscosity of the solution. Examples of thickeners in the solutions under consideration here include polyvinylpyrrolidone, polyethylene glycol, polyacrylic acid and polyacrylates, these being added in a quantity of at most 10% by weight.

Non-solvents within the scope of the present invention include, depending on the type of polymer, for example water, glycerol, triacetin, ethyl lactate, dioctyl adipate, castor oil and polyethylene glycol. They are added to the solvent mixture at most in such a quantity that a homogeneous mixture with the polymer is still formed.

Auxiliaries within the scope of the present invention include conventional stabilizers, nucleating agents, pigments and the like. Their proportion does not exceed 1% by weight of the solvent mixture.

The dissolution of the polymer is preferably carried out at temperatures of 60°–240° C.

Preferably, a solvent mixture is used which contains 20 to 65% by weight of dissolved $\epsilon$-caprolactam.

To form the lumen of hollow fibers, internal fluids are usually applied. Depending on the choice of internal fluid, the latter can, in the present invention, also have an effect on the structure of the zone adjoining the inner wall. In this case, the processing temperature, the characteristics of the solvent/non-solvent property and the miscibility with the solvent mixture play an important part.

It is possible in the present invention to transform the formed solution into the solid phase in a conditioning chamber charged with non-solvent vapors.

In an embodiment of the invention, it is also possible, with adequate residence time, to effect the transformation into the solid phase by spontaneous crystallization of the solvent mixture after supercooling.

The transformation into the solid phase is in general effected by coagulation of the formed solution in a non-solvent bath. In a further embodiment of the invention, the transformation into the solid phase is effected by coagulation in a nonsolvent bath, the temperature of the solution and the temperature of the non-solvent bath being 40°–60° C.

In a special embodiment of the invention, the transformation into the solid phase is effected by using a solvent mixture which is comprised of $\epsilon$-caprolactam, a latent solvent and a non-solvent, and if appropriate a thickener and auxiliaries, and which forms a homogeneous phase with the polymer at elevated temperature, this homogeneous phase forming two separate liquid phases after cooling to a lower temperature; and by cooling the homogeneous phase of polymer and solvent mixture in such a way that initially a segregation into two liquid phases takes place before the solidification of the polymer to give a membrane occurs.

It has hitherto not been possible to produce microporous powders and shaped articles from polyphenylene sulfide, because of the low solubility of the polymer. The process according to the invention now makes it possible also to produce microporous polyphenylene sulfide products. Polyphenylene sulfide is resistant to most organic and inorganic acids, aqueous alkalis, amines, hydrocarbons, aldehydes, ketones, nitriles, nitrobenzene, alcohols, phenols, other organic solvents and aqueous solutions of inorganic salts. Polyphenylene sulfide dissolves only above 200° C. in, for example, 1-chloronaphthalene. Polyphenylene sulfide is resistant to thermal stresses up to about 260° C. Wherever extreme chemical and/or thermal stresses occur, polyphenylene sulfide can be used with advantage. In other cases where chemical and thermal stability are important, membranes produced according to the invention can be used in which the polymer is a polysulfone. Polyethersulfones are particularly preferred polymers. Further polymers, which are particularly stable chemically and which are amenable to the process according to the invention, include polyvinylidene fluoride and ethylene/chlorotrifluoroethylene copolymers.

The invention also relates to the use of membranes according to the invention of synthetic polymers for ultrafiltration and microfiltration. Ultrafiltration and microfiltration concern pressure-driven membrane filtrations for separating off defined particle sizes. The particle size ranges given in the literature for ultrafiltration and microfiltration largely overlap. On page 3 of the book "Synthetic Polymeric Membranes" by Robert E. Kesting, 1971, FIG. 1.2, the membrane separation processes with the respective particle sizes are illustrated. This illustration shows that the range for ultrafiltration can comprise particle sizes of about (0.003 $\mu$m) to 10 $\mu$m and that for microfiltration about 0.03 $\mu$m up to about 20 $\mu$m.

The membrane according to the invention can, depending on the polymer, be used in the foodstuffs sector, provided that it does not contain any toxically relevant substances in the solvent mixture.

Microporous powders and shaped articles produced according to the invention can advantageously be used for controlled release of active compounds.

The invention is explained in more detail by reference to the examples which follow.

EXAMPLE 1

A homogeneous viscous solution (about 28 PaS/20° C.) was formed at about 110° C. from 15 parts by weight of commercially available polyether-sulfone (type Victrex 5200 from ICI) and 77.5 parts by weight of a mixture consisting of caprolactam/butyrolactone/glycerol in a weight ratio of 45.87:45.87:8.26 and 7.51 parts by weight of polyvinylpyrrolidone as thickener.

After degassing and cooling to the spinning temperature of 40° C., hollow fibers of varying wall thicknesses were formed from this solution by means of a hollow fiber jet, using a fluid internal filling, and immediately solidified in a water bath heated to 40° C. After a residence time of about 10–15 seconds in the water bath, the hollow fibers had been stabilized. The extraction of the solvents was carried out by washing with warm water at 80° C. Drying at about 50° C. was preceded by an extraction pass with isopropanol.

The microscopic evaluation of the various capillary dimensions showed, in all variants in the outer region of the membrane, an about 50–100 $\mu$m thick, fine-pored, outwardly open structure which merged into an increasingly coarse-pored texture towards the middle of the membrane. Towards the lumen side, the cells become more compact again and formed an open-pored inner surface.

FIGS. 1A to 1E shows scanning electron micrographs of the membrane obtained.

In Table 1, the trans-membrane flows of various hollow fibers of different wall thickness are compared.

TABLE 1

| Hollow fibers of 1.0 mm internal diameter | | | |
|---|---|---|---|
| Dimension $d_i$ $d_o$ mm mm | Wall thickness mm | max. pore diameter $\mu m$ | trans-membrane flow water $l/m^2 \times h \times bar$ |
| A 1.0/1.28 | 0.14 mm | ~0.25 $\mu m$ | 5972 |
| B 1.0/1.43 | 0.215 mm | ~0.25 $\mu m$ | 5532 |
| C 1.0/1.51 | 0.255 mm | ~0.25 $\mu m$ | 4805 |
| D 1.0/1.56 | 0.28 mm | ~0.25 $\mu m$ | 4362 |
| E 1.0/1.78 | 0.39 mm | ~0.25 $\mu m$ | 4572 |
| F 1.0/1.90 | 0.45 mm | ~0.25 $\mu m$ | 4000 |
| G 1.0/2.18 | 0.59 mm | ~0.25 $\mu m$ | 4000 |
| H 1.0/2.34 | 0.67 mm | ~0.25 $\mu m$ | 4452 |

EXAMPLE 2

A mixture of 11.25 parts by weight of the polyether-sulfone used in Example 1 and 3.75 parts by weight of a commercially available sulfonated polyether-sulfone was dissolved in caprolactam/butylrolactone/glycerol in a weight ratio of 48:48:6. The hollow fibers, produced in other respects by the method described in Example 1, were immediately wettable with water. They can be used without a hydrophillic treatment, for example with alcohol, for the filtration of aqueous or other hydrophillic media.

EXAMPLE 3

The polymer solution prepared according to Example 1 was spread at room temperature by means of a reverse-roll coater upon a carrier belt and immediately solidified in a warm water bath at 50° C. The resulting flat membrane was washed in water and dried between 90° and 40° C.

The water-wettable flat membrane had the following test values:
Membrane thickness: 0.15 mm
Trans-membrane flow: 6.5 ml/cm$^2$ × minutes × bar measured with isopropanol
Trans-membrane flow: about 8000 l/m$^2$ × hour × bar measured with water

EXAMPLE 4

A commercially available polyether-sulfone was dissolved in the solvent mixture of Example 1 to give a 17% by weight solution and formed into a hollow fiber having an external diameter of 1.0 mm and a wall thickness of 0.2 mm.

The resulting, mechanically very stable hollow fiber had a trans-membrane flow with water of 4000 l/m$^2$ × hour × bar at a maximum pore size of <0.25 $\mu m$.

EXAMPLE 5

A 15% by weight polyether-sulfone solution in 17 parts by weight of caprolactam and 82.5 parts by weight of propylene carbonate with an addition of 8.2% of thickener was spun into hollow fibers. The relatively small proportion of caprolactam caused a very slow stabilization of the fiber. Only after a residence time of about 1 minute was the hollow fiber solidified to such an extent that it was possible to extract it with water.

Figure 2A:
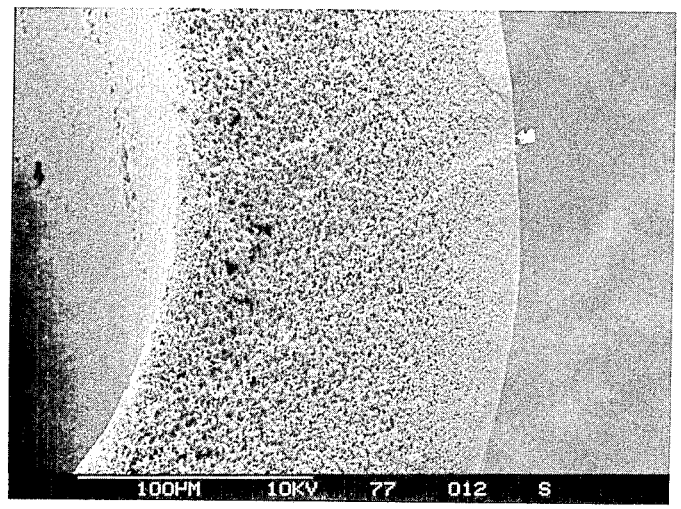
FIGS. 2A to 2C shows scanning electron micrographs of a membrane produced according to Example 5.
Figure 2B:
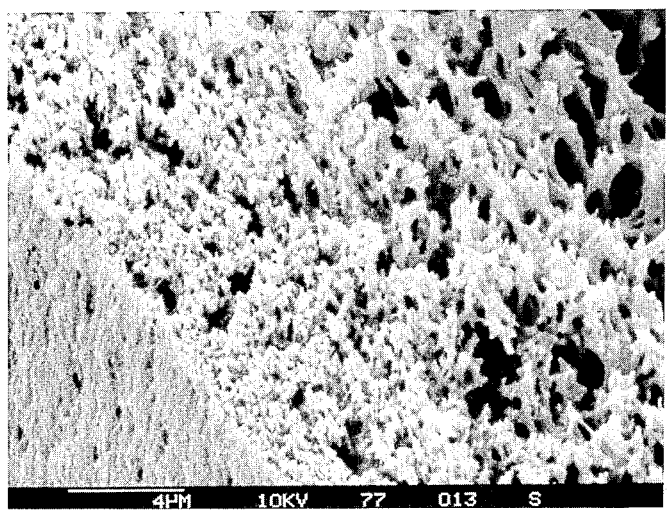
Figure 2C:
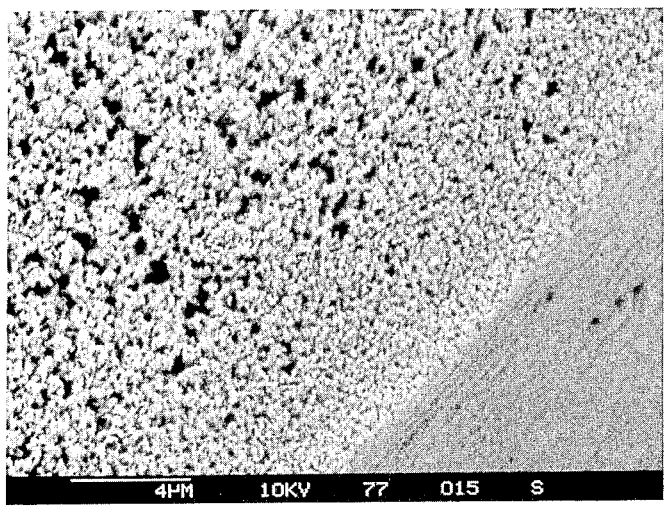

This gave a water-permeable membrane of asymmetrical structure in the wall cross-section. The trans-membrane flow was 5000 l/m$^2$ × hour × bar. FIG. 2 shows scanning electron micrographs of the membrane obtained.

EXAMPLE 6

A warm solution at about 40° C., consisting of 15 parts by weight of polyether-sulfone dissolved in 66.75 part by weight of caprolactam, 21.25 parts by weight of butyrolactone and 11 parts by weight of glycerol was spread on a cold glass plate. On cooling of the solution, the solvent crystallized and thus stabilized the membrane formed. After extraction by water, an openpored, permeable membrane was formed.

EXAMPLE 7

In a heatable stirred vessel, 22.5% by weight of polyvinylidene fluoride (PVDF) of a molecular weight of 226 × 10$^3$ (KYNAR 760) was homogeneously dissolved at a temperature of about 165° C. in a solvent mixture consisting of caprolactam, butyrolactone and dioctyl adipate in a weight ratio of 18.75:18.75:62.5. When part of the solution was cooled, a phase separation temperature of 141° C. and a solidification temperature of the polymer rich phase of 90° C. were found. The bulk of the solution was formed into small tubes. After extraction with warm isopropanol, an open-pored, porous shaped article having a maximum pore size of 0.60 $\mu m$ and a good permeability for isopropanol was formed.

EXAMPLE 8

In a continuously operating mixer unit, a polymer melt of polyvinylidene fluoride (PVDF) of a molecular weight of 434 × 10$^3$ was dissolved under pressure (3 bar) at about 185° C. in the solvent mixture according to Example 7. The 27% by weight solution was fed to a hollow fiber jet and formed, with the aid of a liquid internal filling, into hollow fiber membranes and cooled in a water bath (20° C.). As a result of thermally induced phase separation, the membrane solidified, after the temperature had fallen below the phase separation temperature and solidification temperature of the polymer-rich phase, and could be extracted with isopropanol.

The resulting hollow fibers of the dimensions 1.00 mm internal diameter and wall thickness 0.25 mm had open-pored surfaces. The largest pore size was 0.47 $\mu m$. The trans-membrane flow (with isopropanol) was 6.5 ml/cm × minute × bar.

EXAMPLE 9

20 parts by weight of an ethylene/vinyl alcohol copolymer (Soarnol DT) having an ethylene content of 29 mole % (density 1.21 g/cm$^3$) and 36 parts by weight of caprolactam as well as 44 parts by weight of polyethylene glycol of molecular weight 600 were dissolved at ~180° C. The solution, heated to a temperature of 160° C., was spread by means of a blade onto a carrier tape and cooled in a water bath. The phase separation and solidification temperatures of the polymer-rich phase of the solution were 140° C. and 115° C. respectively.

After extraction with warm water at 60° C. and isopropanol, and subsequent drying, it was possible to obtain a water-wettable, open-pored flat membrane.

Microscopic evaluation showed a uniform pore structure which was slightly asymmetrical along the membrane cross-section.

EXAMPLE 10

A 15% by weight solution of a polyether-imide (Ultem 1000) in 60 parts by weight of caprolactam and 40 parts by weight of propylene carbonate (dissolved at ~200° C.) was formed at 120° C. into a flat membrane. After the temperature had fallen below the phase separation temperature (~90° C.), the membrane could be coagulated out with water and then extracted. This gave a highly permeable structure which could immediately be wetted throughout with alcohol.

EXAMPLE 11

In a stirred vessel, 15% by weight of polysulfone (Ultrason 200) was dissolved at 150° C. in a solvent mixture of caprolactam, butyrolactone and glycerol in a weight ratio of 47:47:6. A clear, slightly yellowish, viscous solution formed after cooling and degassing at room temperature. The solution was spread by means of a reverse-roll coater onto a carrier tape, and the flat membrane was coagulated in water. After extraction, the membrane formed showed an open-pored structure with pore sizes suitable for use in microfiltration.

EXAMPLE 12

A 20% by weight solution, prepared at 180° C., of polyethylene terephthalate (relative viscosity 1.63) in caprolactam/butyrolactone (weight ratio 2:1) was spread on a glass plate and solidified in water. The phase separation of the homogeneous solution was observed at about 155° C. After extraction in isopropanol, this gave an open-pored, permeable, stable membrane.

EXAMPLE 13

16 parts by weight of polyacrylonitrile powder, 42 parts by weight of caprolactam and 42 parts by weight of butyrolactone were weighed into a glass flask. With stirring, a homogeneous viscous solution formed at about 80°-100° C., which solidified on cooling at about 35°-40° C. by phase separation. Forming into a flat membrane was carried out at about 60° C. After coagulation of the solution and extraction of the solvents with water, a porous membrane was formed.

EXAMPLE 14

At about 120° C., a 17% by weight polymethyl methacrylate solution (type PMMA-HW55) in 76 parts by weight of caprolactam and 24 parts by weight of castor oil was spread on a glass plate and solidified with water. (Phase separation temperature of the solution: 90° C.; solidification temperature of the polymer-rich phase: 60° C.). After extraction of the solvents in water and isopropanol, this gave an open-pored membrane. The stiffness of the polymer leads to membranes having low elongation values.

EXAMPLE 15

17% by weight of polycarbonate (from Bayer, type SCL 2579/3) was dissolved at 130° in caprolactam. With stirring, the solution was cooled to approximately the crystallization temperature of the solvent of about 70° C. and introduced into warm water, and the resulting membrane particles were extracted by means of a high-speed stirrer. After extraction in water, this gave a porous polycarbonate powder which, after charging with active compounds, is eminently suitable for controlled release of the active compounds.

We claim:

1. A process for producing microporous powders or shaped articles, comprising preparing a solution of at least one polymer selected from the group consisting of polyvinylidene fluoride, polyphenylene sulfide, polysulfone, polyacrylonitrile, ethylene/vinyl alcohol copolymer, ethylene/chlorotrifluoroethylene copolymer, polyether-sulfone, polyether-imide, polymethyl methacrylate, polycarbonate, cellulose triacetate and copolymers thereof in a solvent mixture containing e-caprolactam as the essential dissolving constituent, forming said solution, and triggering phase separation thermally or by a non-solvent.

2. The process as claimed in claim 1, wherein the solvent mixture contains at least 10% by weight of e-caprolactam.

3. The process as claimed in claim 2, wherein the solvent mixture contains 20–65% by weight of e-caprolactam.

4. The process as claimed in claim 1, wherein the polymer is dissolved at temperatures of 60° to 240° C.

5. The process as claimed in claim 1, wherein the phase separation is effected by spontaneous crystallization of the solvent mixture after supercooling.

6. The process as claimed in claim 1, wherein the phase separation is triggered by coagulation in a non-solvent bath.

7. The process as claimed in claim 1, wherein the solvent mixture is comprised of ε-caprolactam, a latent solvent and a non-solvent, and forms a homogeneous phase with the polymer at elevated temperatures, this homogeneous phase forming two separate liquid phases after cooling to a lower temperature, and wherein the homogeneous phase of polymer and solvent mixture is cooled in such a way that initially a segregation into two liquid phases takes place before solidification of the polymer occurs.

8. The process as claimed in claim 7, wherein said shaped article is a membrane.

9. The process as claimed in claim 7, wherein said solvent mixture is further comprised of a thickener and auxiliaries.

10. The process as claimed in claim 1, wherein said shaped article is a membrane.

11. The process as claimed in claim 10, wherein said membrane is in the form of a flat film, tubular film or hollow fiber.

* * * * *